E. D. WOODING.
Grain Drill.
No. 16,511.
Patented Jan. 27, 1857.
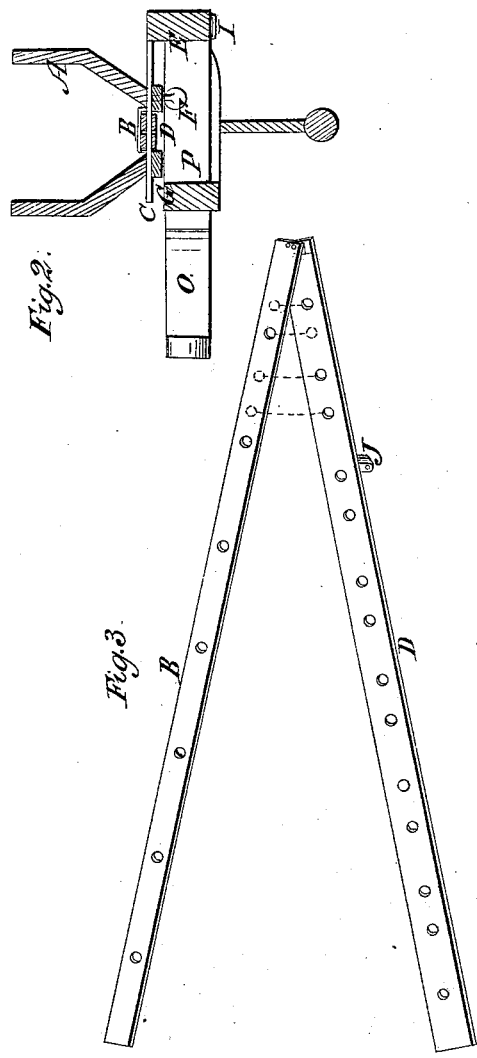
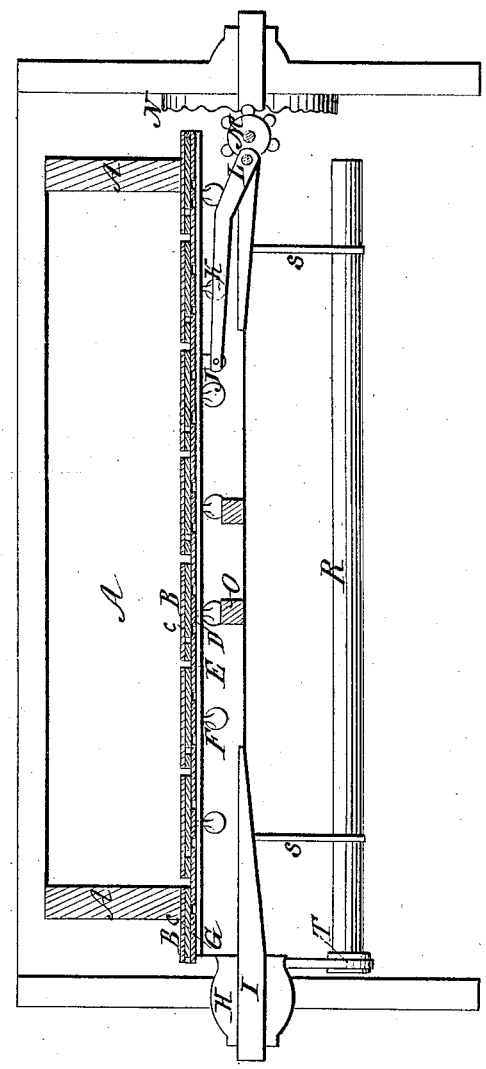

UNITED STATES PATENT OFFICE.

ERASTUS D. WOODING, OF DIXON, ILLINOIS.

IMPROVEMENT IN SEEDING-MACHINES.

Specification forming part of Letters Patent No. 16,511, dated January 27, 1857.

*To all whom it may concern:*

Be it known that I, ERASTUS D. WOODING, of the town of Dixon and county of Lee, in the State of Illinois, have invented a new and Improved Mode of Sowing Grain and other Seeds, which I verily believe has not been known before; and I do hereby declare that the following is a full and exact description of the same, reference being had to the accompanying drawings, and to the letters of reference marked thereon.

The nature of my invention consists in the construction of a double reciprocating seed-slide with double the amount of holes in the under section that is made in the upper slide, and in the construction of seed-regulators for adjusting the quantity of seed to be sown to the acre, and also in the construction of a revolving spreading-roller.

To enable others skilled in the art to make and use my invention, I will proceed to describe its construction and operation. I use two ordinary wheels as a carriage.

Figure 1 is a longitudinal elevation of my machine. Fig. 2 is a cross-section of the hopper box, seed-slide, seed-regulators, and sill-pieces or sides of the frame, to which the frame and slides, hopper-box, and draft-piece are attached, the whole being attached to the axle of the cart, the wheels not being represented in this figure. Fig. 3 shows the seed-slides with their holes and connection at one end.

A is the hopper or seed-box; B D, the seed-slides worked by the wheel N, pinion M, and pitman K; C, the seed-regulators for adjusting the quantity of seed desired to be sown to the acre, and are secured in their place by the set-screws F, the seed-regulators being perforated with holes to allow the seed to pass alternately as the seed-slide reciprocates; E, the sill-pieces or sides of the frame; F, the set-screws for securing the seed-regulators in their places. G are sub-sills or pieces, on which the seed-regulators are placed, and run across the machine, and are supported in their place by lying on the cross-pieces or sills P, Fig. 2; H, the carriage-wheels; I, the axle-arm, attached to the sill-piece E. J is a stud attached to the under seed-slide, to which the pitman K is attached; L, the pitman-journal, which is a crank or axle, to which the pinion M is attached. O is the tongue or draft-piece; P, the cross-sill, framed into the side sills, E, and the axle-arms I, being bolted and secured to the sill E, complete the carriage portion of the work; R, the revolving spreading-roller, supported by the braces S; T, the band for driving the roller, said band passing around the hub of the driving-wheel H, which by its revolving motion causes a more regular distribution of the grain on the ground, which is a great desideratum in sowing-machines, the whole being constructed and operated for the purposes above described.

Having thus fully described my improved seeding-machine, what I claim as my invention, and desire to secure by Letters Patent, is—

The spreading-roller H, when constructed to revolve, for the purposes substantially as set forth.

ERASTUS D. WOODING.

Witnesses:
    B. J. WOOD,
    E. McDANIELS.